No. 809,533. PATENTED JAN. 9, 1906.
C. S. SCOTT.
WHEEL RIM.
APPLICATION FILED MAY 3, 1905.
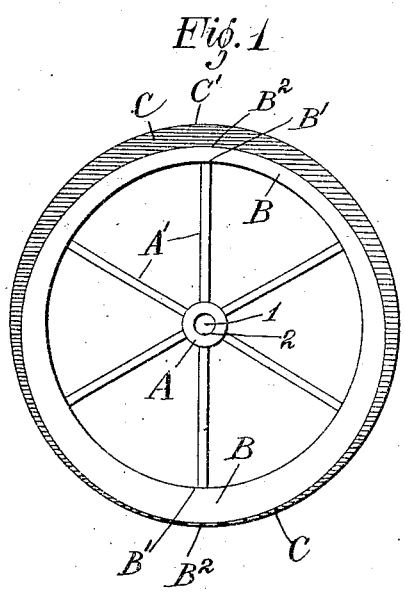
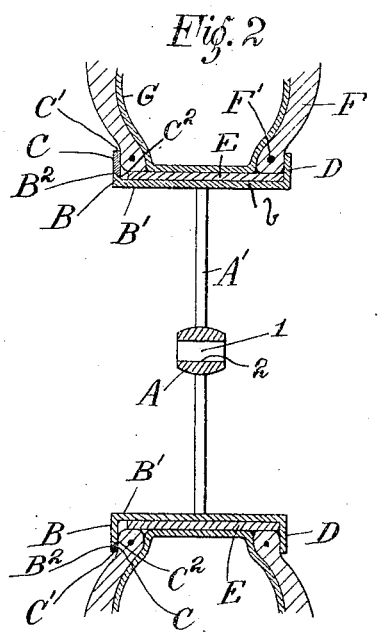
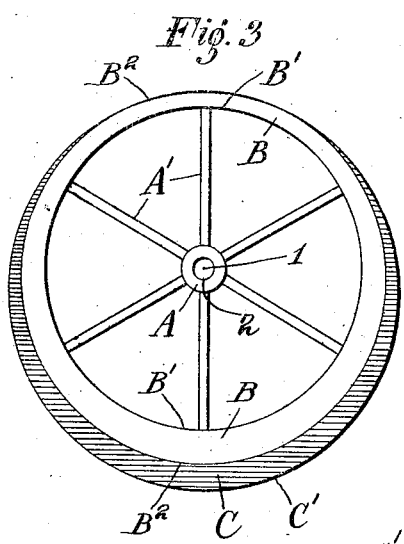
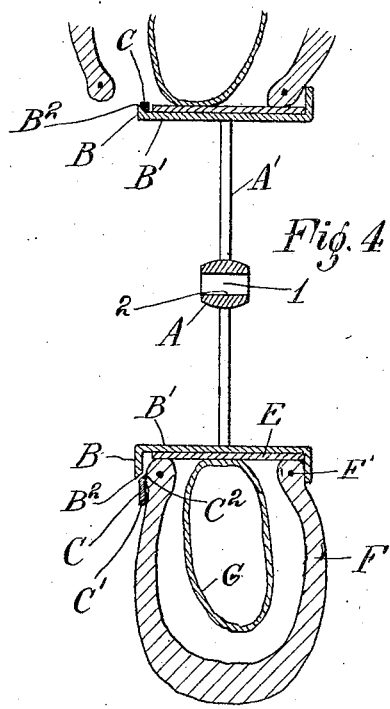
Witnesses
Ivan Konigsberg.
M. Tetzlaff
Inventor
Charles S. Scott
By his Attorneys
Lyons & Bissing

UNITED STATES PATENT OFFICE.

CHARLES S. SCOTT, OF CADIZ, OHIO, ASSIGNOR OF ONE-HALF TO FRANK A. SEIBERLING, OF AKRON, OHIO.

WHEEL-RIM.

No. 809,438.  Specification of Letters Patent.  Patented Jan. 9, 1906.

Application filed May 3, 1905. Serial No. 258,649.

*To all whom it may concern:*

Be it known that I, CHARLES S. SCOTT, a citizen of the United States, and a resident of Cadiz, Harrison county, Ohio, have invented a new and useful Improvement in Rims for Vehicle-Wheels for Pneumatic Tires, of which the following is a specification.

The object of my invention is to produce a rim for vehicle-wheels, more especially such as are employed on automobiles, by means of which the pneumatic tires which are commonly used in connection therewith may be readily attached and detached for the purpose of repairing the tire or its inner tube.

To this end my invention consists of a rim having a rim-flange with an eccentric outer edge coöperating with a rotatable auxiliary flange. This auxiliary flange has its inner and outer edges shaped as eccentric circles in such a manner that the inner edge of the auxiliary flange is juxtaposed to the outer edge of the rim-flange. In this matter the auxiliary flange in its working position has its outer edge concentric with the wheel and in a position to confine the pneumatic tire. When, however, the auxiliary flange is rotating one hundred and eighty degrees, to what may be called its "detaching" position, its outer circular edge becomes eccentric to the wheel and the pneumatic tire may be removed over that portion of the edge which lies nearest the wheel center.

In the drawings, Figure 1 is a side elevation of the vehicle-rim with the parts in their working position. Fig. 2 is a cross-section showing the pneumatic tire in place with the parts in a corresponding position. Fig. 3 is a side elevation of a vehicle-rim with the parts in their detaching position. Fig. 4 is a cross-section of the parts in a corresponding position, showing the tire about to be detached; and Fig. 5 is a detail.

The vehicle-rim consists of a hub A, having spokes A', secured in a suitable manner to a rim $b$, having a rim-flange D on one side, of any suitable construction, and the rim-flange B, which is the subject of this invention, on the other side. The rim-flange B has its inner surface B' concentric with the axis 1 of the wheel-rim and its outer edge $B^2$ shaped as a circle struck from the point 2 as a center, which point 2 is eccentric to the wheel center 1.

The auxiliary flange C is annular in character and has an inner circle $C^2$, which in the position shown in Fig. 2 has its center at the point 2. The diameter of the circle $C^2$ is somewhat smaller than the diameter of the circle $B^2$, so that the auxiliary flange is in all its positions held from removal from the wheel-rim by the rim-flange B. The outer edge $C'$ of the auxiliary is a circle, which in the position shown in Fig. 2 has the point 1 for its center, which means that the outer edge of the auxiliary flange acts, to all intents and purposes, in the position of the parts shown in Fig. 2 as if it were in one piece with the rim-flange B. Put in another way, the eccentric rim-flange B has a narrow part at the top and a broad part at the bottom in the position shown in Fig. 1. On the other hand, the auxiliary flange C has a broad part at the top and a narrow part at the bottom in the same position. Similar remarks apply for other angular positions around the wheel-rim. The point is that in the position of Fig. 1 the broad parts of the rim-flange aline with the narrow parts of the auxiliary flange, and vice versa, so that there is a uniform width of effective rim all round the wheel, which acts to hold the tire in place.

When it is desired to remove the pneumatic tire, it is merely necessary to rotate the auxiliary flange through half a circle, whereupon we have the position of parts shown in Fig. 4, in which the narrow part of the auxiliary flange has come into juxtaposition with the narrow part of the rim-flange. Nothing prevents the operator, therefore, from sliding the pneumatic tire laterally from the rim at this point, and a portion of the tire-shoe having thus become free and being stretched on the chord of a circle instead of on the longer arc the remaining portion of the tire grows so loose on the wheel-rim that the whole tire may be peeled off, as it were, in the same manner.

I prefer to make the inner face of the rim-flange B near its outer edge $B^2$ frusto-conical in shape, in which case the outer face of the auxiliary flange C near the edge $C^2$ is made of similar shape. In this way when the pneumatic tire is inflated it will be evident that the auxiliary flange automatically centers itself upon the rim-flange through the interaction of the frusto-cones. What is more, by thus beveling the edge $C^2$ of the auxiliary flange its bearing-surface on the face of the rim is reduced in area, so that there will be less friction when it is rotated through half a circle to get it into its detaching position.

It is manifestly desirable when the parts are in their detaching position that the base of the tire-shoe should rest on a support which is flush with or even above the edge $B^2$ of the rim at the detaching-point—that is, the point of the edge $B^2$ nearest the wheel center. While this object may be accomplished in several ways, I prefer to use a filling-piece E, secured to the surface of the rim in any suitable manner, the thickness of which piece is so chosen that its upper face is flush with the detaching-point of the circle $B^2$, as just defined. The filling-piece is spaced to leave a groove at the inner face of the rim-flange in which groove the auxiliary flange may turn. In this way the selvage of the tire-shoe will meet with no obstruction as it slides laterally off the wheel-rim in detaching and yet I have a shape of wheel-rim which may be readily rolled. I may say, too, that my invention is applicable either to a pneumatic tire having an inextensible selvage, in which case the auxiliary flange may be flat or have its outer edge curved outwardly, or I may use my wheel-rim for the so-called "clencher-type," in which case the edge $B^3$ of the auxiliary flange will be curved inwardly, as indicated in Fig. 5. I have shown in the drawings an inextensible type of selvage F' on the tire-shoe F, inflated by the usual inner tube G.

I may state in conclusion that I have exaggerated the proportion of the parts in the drawings, so that the eye may readily catch the principle of the invention.

I claim—

1. A wheel-rim having a rim-flange with an eccentric outer edge, and a rotatable auxiliary flange coöperating therewith, substantially as described.

2. A wheel-rim having a rim-flange with an eccentric outer edge, and a rotatable auxiliary flange having inner and outer edges shaped as eccentric circles, the inner edge of the auxiliary flange being juxtaposed to the outer edge of the rim-flange, substantially as described.

3. A wheel-rim having a rim-flange with an eccentric frusto-conical edge, and a rotatable auxiliary flange, having a frusto-conical inner edge coöperating with the outer edge of the rim-flange, substantially as described.

4. A wheel-rim having a rim-flange with an eccentric outer edge and a filling-piece spaced to leave a groove at the inner face of the rim-flange, in combination with an auxiliary flange rotatable in the groove and coöperating with the rim-flange, substantially as described.

5. A wheel-rim having a rim-flange with an eccentric outer edge, a rotatable auxiliary flange coöperating therewith, and a pneumatic tire forcing the auxiliary flange against the rim-flange when inflated, substantially as described.

6. A wheel-rim having a rim-flange with an eccentric outer edge, a rotatable auxiliary flange having inner and outer edges shaped as eccentric circles, the inner edge of the auxiliary flange being juxtaposed to the outer edge of the rim-flange, and a pneumatic tire forcing the auxiliary flange against the rim-flange when inflated, substantially as described.

In testimony whereof I have signed my name to this specification in the presence of two subscribing witnesses.

CHAS. S. SCOTT.

Witnesses:
ROBERT C. SCOTT,
MILTON TAGGART.